United States Patent Office 3,306,926
Patented Feb. 28, 1967

3,306,926
PROCESS FOR PREPARATION OF LEATHER-TREATING COMPOUNDS
Maynard B. Neher, Columbus, and Victor G. Vely, Hilliards, Ohio, assignors to Battelle Memorial Institute, Columbus, Ohio, a corporation of Ohio
No Drawing. Filed Mar. 23, 1962, Ser. No. 182,079
2 Claims. (Cl. 260—471)

This invention relates to the rapid preparation of modified isocyanates containing both free isocyanate groups and urethane linkages.

This process is useful for producing products that are highly effective for improving the surface properties of leather and for producing such products with fewer steps and in a shorter time. The cost of producing the leather-treating products is significantly reduced as compared with previously known methods of preparation.

Previously, the modified isocyanate composition had to be prepared using a two-step process employing relatively long reaction times in each step in order to achieve a product that would be most effective for improving surface properties of leather. In the past, attempts to prepare products by means of a one-step process yielded products which were much less effective than those achieved by the two-step process. This difference was inferred to be due to structural difference in the final products. The one-step process probably yielded products having a greater degree of cross linking and, therefore, "high" molecular weight. Products formed by the two-step process probably show less cross linking because the first half of the reaction yielded a modified diisocyanate "prepolymer." This, in turn, upon the addition of a polyhydroxy compound reacted slowly and in a more orderly manner than an unmodified diisocyanate in a mixture of dihydroxy and polyhydroxy compounds.

The process described herein includes the use of organotin compounds as catalysts for the rapid preparation of an effective modified diisocyanate leather-treating composition. Organotin compounds have been described in the literature as being employed as catalysts for the preparation of one-step polyether foams. One specific example of such a catalyst is di-n-butyltin dilaurate.

According to the present invention, a diisocyanate or diisothiocyanate is reacted with a polyhydroxy or polyamine in the presence of the organotin catalyst to form a monomeric condensation product containing three or more free isocyanate or isothiocyanate groups.

Included in the present invention is a process for the preparation of a substantially monomeric modified organic isocyanate leather-treating composition, characterized by the structural formula:

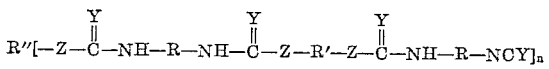

where $n$ is an integer greater than 2, R is a divalent organic radical selected from the group consisting of alkylene, arylene, and alkarylene radicals having a molecular weight of up to about 194, R' is a divalent organic radical selected from the group consisting of polyoxyalkylene, polyalkylene, polyalkylene carbonate, and alkylene polyamide radicals having a molecular weight in the range of 200 to 4000, R" is a polyvalent organic radical derived from a compound selected from the group of compounds consisting of polyhydroxyglycerides, aliphatic polyols, polyalkylene oxide condensation products of polyhydroxyglycerides, and polyalkylene oxide condensation products of aliphatic polyols having a molecular weight in the range of 400 to 2000, Z is a radical selected from the group consisting of —O— and —NH— radicals, and Y is an atom selected from the group consisting of oxygen and sulfur. The process comprises reacting in the presence of an organotin catalyst a compound of the formula:

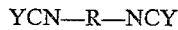

wherein R and Y are as aforestated, with a difunctional compound selected from the group consisting of a difunctional alcohol, amine, and amino alcohol having its two functional groups connected to the divalent organic radical R', wherein R' is as aforestated, and with a polyfunctional compound of the formula:

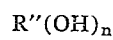

wherein $n$ is greater than two and the latter said compound is selected from the group consisting of polyhydroxyglycerides, aliphatic hydrocarbon polyols, polyalkylene oxide condensation products of polyhydroxyglycerides, and polyalkylene oxide condensation products of aliphatic hydrocarbon polyols having a molecular weight in the range of 400 to 2000. The organotin catalyst is selected from the group consisting of the formulas:

$$Sn(OR)_2$$
$$SnR'_2$$
$$R'_2SnO$$
$$Sn(OR)_4$$
$$SnR'_4$$
$$M_2(Sn(OR)_4)$$
$$MH(Sn(OR)_4)$$
$$M_2(Sn(OR)_6)$$
$$MH(Sn(OR)_6)$$
$$M'(Sn(OR)_4)$$
$$M'(HSn(OR)_4)_2$$
$$M'(Sn(OR)_6)$$
$$M'(HSn(OR)_6)_2$$

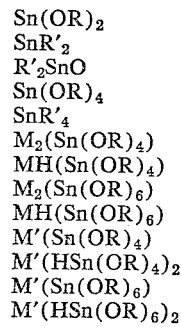

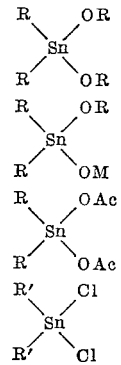

wherein each R represents an alkyl radical containing from 1 to 8 carbon atoms, each R' radical represents a substitutent selected from those consisting of alkyl radicals containing from 1 to 8 carbon atoms and aryl radicals of the benzene series containing from 6 to 9 carbon atoms, M represents an alkali metal, M' represents an alkaline earth metal, and Ac represents an acyl radical derived from a monobasic carboxylic acid containing from 2 to 18 carbon atoms.

The linkage formed through the reaction of an hydroxyl group with an isocyanate group is a carbamate. A carbamate group or linkage may be depicted as follows:

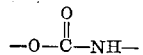

The reaction of an hydroxyl group with an isothiocyanate group yields a thiocarbamate group:

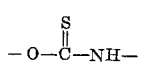

The linkage formed through the reaction of an amine group with an isocyanate group is a substituted urea which may be depicted as follows:

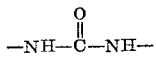

A thiourea is formed through the reaction of an amine group and an isothiocyanate group:

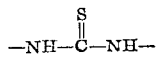

The following reaction illustrates one possible reaction involving the reaction of a diisocyanate compound in the presence of an organotin compound to form large monomers where polyhydroxy cross-linking compounds are employed:

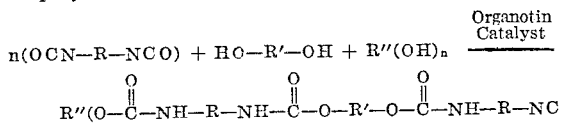

$n=3$ or more and R denoting a divalent radical, R' a divalent organic radical and R'' a polyvalent organic radical.

The reaction products obtained when a diisothiocyanate is used as a reactant in place of the diisocyanate will be identical to the formulations illustrated above, except that in all cases the oxygen of the isocyanate and carbonyl radicals will be replaced by a sulfur atom. The linkage formed through the reaction of an hydroxyl group with an isothiocyanate is a thiocarbamate. The linkage formed through the reaction of an amine group with an isothiocyanate is a substituted thiourea.

The products described above are illustrative of the modified isocyanate and isothiocyanate compositions that are of great value in treating leather. In preparing these compositions, among the organic compounds, both aromatic and aliphatic diisocyanates and diisothiocyanate may be used as reactants. The aliphatic diisocyanates, however, are more toxic and for this reason are not preferred.

Among the organic diisocyanates and diisothiocyanates that may be used, the following with molecular weights up to about 278 are representative. The illustrated representative organic diisocyanate and diisothiocyanates are of the general formula YCN—R—NCY wherein Y is selected from the group of O and S and R is a divalent organic radical selected from the group consisting of alkylene, arylene, and alkarylene radicals having a molecular weight up to about 194. Representative of those containing an aliphatic nucleus are:

Hexamethylene diisocyanate
Ethylene diisocyanate
Trimethylene diisocyanate
Decamethylene diisocyanate
Tetramethylene diisocyanate
Propylene diisocyanate
Butylene-1,2-diisocyanate
Butylene-1,3-diisocyanate
Decamethylene diisothiocyanate
Hexamethylene diisothiocyanate
Propylene-diisocyanate
Butylene-1,3-diisothiocyanate The following are representative of organic diisocyanates and diisothiocyanates, which contain an aromatic nucleus, that may be used as reactants:

2,4-tolylene diisocyanate
2,6-tolylene diisocyanate
3,3'-bitolylene 4,4'-diisocyanate
Diphenyl methane 4,4'-diisocyanate
3,3'-dimethyl diphenyl methane 4,4'-dissocyanate
m-Phenylene diisocyanate
p-Phenylene diisocyanate
o-Phenylene diisocyanate
p-Phenylene diisothiocyanate
2,4-tolylene diisothiocyanate
2,6-tolylene diisothiocyanate Inorganic diisocyanate may be used in place of the organic diisocyanate and diisothiocyanates. An example of an inorganic diisocyanate is sulfodiisocyanate.

The difunctional alcohol or amine reacted with the diisocyanate or diisothiocyanate is preferably a linear polyether, that is, a glycol having its hydroxyl groups separated by a repeating ether linkage such as ethylene oxide, propylene oxide, or butylene oxide. These glycols are known as polyoxyethylenes, polyoxypropylenes, and polyoxybutylenes. Examples of the polyoxyethylenes useful as reactants are the polyethylene glycols having a molecular weight ranging from about 200 to about 4000. Examples of the polyoxypropylene useful as reactants are the polypropylene glycols having a molecular weight ranging from about 200 to about 4000. Examples of the polyoxybutylenes useful as reactants are the polybutylene glycols having a molecular weight ranging from about 200 to about 4000. Moreover, either mixtures of different molecular weights of one type of polyether or mixtures of different polyethers can be employed as reactants so as to produce a particular product.

Other suitable difunctional hydroxy-terminated compounds that can be reacted with a diisocyanate or diisothiocyanate are hydrocarbon derivatives, such as polymethylene glycols having a molecular weight ranging from about 200 to 4000 and adducts of diethylene glycol and chloroformates, such as monoethylene glycol bis chloroformate and diethylene glycol bis chloroformate.

Suitable amines for reaction with the diisocyanates or diisothiocyanates to form the modified compounds of interest are either a diamine or polyamine, depending on the end product desired. Examples of specially prepared diamines that can be used are octadecamethylene-1,18-diamine and condensation products of adipic acid and hexane diamine.

The following are examples of some of the polyfunctional materials that may be employed as reactants to prepare the modified isocyanate or isothiocyanate compositions:

(1) Castor oil, castor oil modified with polyols and trihydroxy polyoxypropylenes having three linear chains and three hydroxyl groups with either glycerine, trimethylol propane, or hexane as the nucleus of the molecule; triamine prepared from diethylenetriamine, tolylene diisocyanate and hexane diamine;

(2) Tetrahydroxy compounds such as those prepared by the addition of alkylene oxides, such as propylene or ethylene oxide to diamines such as ethylene diamine;

(3) Hexahydroxy compounds, such as those prepared from sucrose, or those prepared by reacting propylene oxide with sorbitol to obtain chains of polyoxypropylene, each chain terminated with an hydroxyl group.

The effectiveness of the modified isocyanate composition prepared by the one-step process with the catalyst was found to be twice that of the products formed in one step without the aid of a cataylst at comparable treatment levels of 3 to 5 grams per sq. ft. of leather. The results were equivalent when the products from the one-step process with catalyst were compared on leather with the products from the two-step process without catalyst.

The aforedescribed one-step process for preparation of the modified isocyanates and isothiocyanate compositions is carried forth in the presence of an organotin catalyst. A useful organotin catalyst for the process always contains at least one organic radical. All of these organotin compounds provide an observable catalytic effect with the exact catalytic effect varying somewhat depending on the type and nature of the particular organotin compound employed as the catalyst. Preferred catalysts are the tetravalent organotin compounds. Most desirable catalysts are those tetravalent organotin compounds which have two organic radicals linked to the tin atom by a tin-carbon bond.

Among the organotin compounds that may be used, the following are illustrative:

Dimethyltin dichloride
Bis(2-ethyl hexyl) tin oxide
Tri-n-butyltin acetate
Di-n-butyltin diacetate
Di-n-butyltin dilaurate
Di-n-butyltin dichloride
Di-n-butyltin dilaurylmercaptide A partial listing of useful catalysts includes complexes and compounds of both divalent or tetravalent tin of the general formulas set forth below:

$Sn(OR)_2$
$SnR'_2$
$R'_2SnO$
$Sn(OR)_4$
$SnR'_4$
$M_2(Sn(OR)_4)$
$MH(Sn(OR)_4)$
$M_2(Sn(OR)_6)$
$MH(Sn(OR)_6)$
$M'(Sn(OR)_4)$
$M'(HSn(OR)_4)_2$
$M'(Sn(OR)_6)$
$M'(HSn(OR)_6)_2$

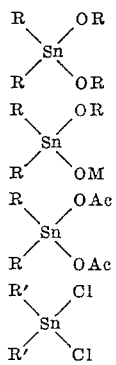

wherein each R represents an alkyl radical containing from 1 to 8 carbon atoms, each R' radical represents a substituent selected from those consisting of alkyl radical containing from 1 to 8 carbon atoms (R radicals) and aryl radicals of the benzene series containing from 6 to 9 carbon atoms (benzyl, phenyl, phenylethyl, tolyl, etc., radicals), M is an alkali metal (such as lithium, sodium, or potassium), M' is an alkaline earth metal (such as Mg, Ca or Sr), and Ac represents an acyl radical

derived from a monobasic carboxylic acid containing from 2 to 18 carbon atoms (such as acetyl, butyryl, lauroyl, benzoyl, stearoyl, etc.).

The concentration of organotin required to achieve satisfactory products from the one-step process was found to be about 0.025 percent based on total resin weight of the composition. Higher concentrations of organotin catalyst were not required for the process. Concentrations greater than 0.5 percent were deleterious to the storage stability of the leather-treating composition. The catalyst in high concentration presumably enhances the reaction between free isocyanate groups and the active hydrogen of the urethane linkage causing premature gelation. In addition to satisfactory leather-treating compositions formed by this process, use of the organotin catalyst results in a substantial decrease in manufacturing costs. For example, seven hours' reaction time at 100° C. would be required to form a typical leather-treating composition using the two-step process without a catalyst. With 0.025 percent catalyst based on total resin weight of the same leather-treating composition, the reaction time is reduced to the time required to mix the several polyhydroxy components with the unmodified diisocyanate and organotin in solvent and to heat the reactor to 100° C. At this point, usually, one-half hour, the leather-treating composition is formed as indicated by titration for unreacted diisocyanate using the dibutyl amine-alcoholic HCl titration method. The reduction of the time factor from the two-step method to the one-step-catalyst method is by a factor greater than 14. The savings in cost of manufacture are apparent.

The following examples will serve to illustrate the invention.

*Example 1*

To 1111.2 parts of an isomeric mixture of 2,4 and 2,6-tolylene diisocyanate assayed at 47.6 percent isocyanate and 3.2 parts of di-n-butyltin dilaurate, both under an atmosphere of dry nitrogen and agitation, the following mixture of polyoxypropylenes was added: 1528.7 parts of polypropylene glycol with an hydroxyl number of 110.1, 3037.9 parts of polypropylene glycol with an hydroxyl number of 55.4, and 729.8 parts of a trihydroxy polyoxypropylene with an hydroxyl number of 174.5. In addition, 2135.8 parts of an aromatic solvent composed almost entirely of high boiling toluene, such as ethyl toluene, was added. The mixture was heated to about 100° C., then 9763 parts of aromatic solvent were added and the mixture was cooled to room temperature.

*Example 2*

To 889 parts of an isomeric mixture of 2,4 and 2,6-tolylene diisocyanate assayed at 47.6 percent isocyanate and 3.17 parts of di-n-butyltin dilaurate, both under an atmosphere of dry nitrogen and agitation, a mixture of the following polyoxypropylenes was added: 4860.7 parts of polypropylene glycol with an hydroxyl number of 55.4 and 582.6 parts of trihydroxy polyoxypropylene with an hydroxyl number of 174.5. In addition, 2110.7 parts of an aromatic solvent, essentially ethyl toluene, were added. The mixture was heated to about 100° C., then 9648.2 parts of aromatic solvent were added and the mixture was cooled to room temperature.

*Example 3*

To 1312.5 parts of diphenyl methane 4,4'-diisocyanate and 2.7 parts of di-n-butyltin dilaurate, both under an atmosphere of dry nitrogen and agitation, a mixture of the following polyoxypropylenes was added: 1280 parts of polypropylene glycol with an average molecular weight of 2025 and 620 parts of trihydroxy polyoxypropylene with an average molecular weight of 1000. In addition, 1800 parts of ethyl toluene were added. The mixture was heated to about 100° C., then 8210 additional parts of ethyl toluene and 5.4 parts of 2,4-dichlorobenzoyl chloride were added. The solution was cooled to room temperature.

*Example 4*

The procedure of Example 1 was followed substituting 3.2 parts of di-n-butyltin diacetate for the di-n-butyltin dilaurate.

*Example 5*

The procedure of Example 2 was followed substituting 3.17 parts of di-n-butyltin dichloride for the di-n-butyltin dilaurate.

*Example 6*

The procedure of Example 1 was followed substituting a mixture of polyoxyethylenes of the same hydroxyl number for the polyoxypropylenes.

*Example 7*

The procedure for Example 2 was followed substituting a mixture of polyoxybutylenes of the same hydroxyl number for the polyoxypropylenes.

Example 8

The procedure for Example 1 was followed except 1058.4 parts of hexamethylene diisocyanate was used in place of the isomeric mixture of 2,4–2,6-tolylene diisocyanate.

In each of the preceding examples a titration for unreacted isocyanate using the dibutyl amine-alcoholic HCl method, showed within about one-half hour or less that substantially all of the diisocyanate had reacted. As contrasted to the like process without the use of the organotin catalyst, unreacted diisocyanate was still present after approximately seven hours.

Example 9

The procedure of Example 1 is repeated except that in place of the 3.2 parts of di-n-butyltin dilaurate there is employed an equivalent amount of another organotin catalyst containing at least one organic radical. An observable catalystic effect is noted with each of the following organotin compounds:

Tri-n-propyltin acetate
Diethylphenyltin acetate
Di-n-butyltin dilaurylmercaptide
Diethyl-n-octyltin iodide
Triethyl-n-octyltin
Triphenyltin chloride
Disodiumdiphenyltin

What is claimed is:

1. A process for preparation of a substantially monomeric modified organic isocyanate leather-treating composition characterized by a structural formula

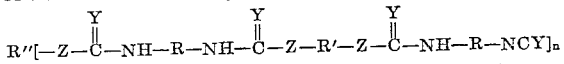

where $n$ is an integer greater than 2, R is a divalent organic radical selected from the group consisting of alkylene, arylene, and alkarylene radicals having a molecular weight of up to about 194, R' is a divalent organic radical selected from the group consisting of polyoxyalkylene, polyalkylene, polyalkylene carbonate, and alkylene polyamide radicals having a molecular weight in the range of 200 to 4000, R'' is a polyvalent organic radical derived from a compound selected from the group of compounds consisting of polyhydroxylglycerides, aliphatic polyols, polyalkylene oxide condensation products of polyhydroxylglycerides, and polyalkylene oxide condensation products of aliphatic polyols having a molecular weight in the range of 400 to 2000, Z is a radical selected from the group consisting of —O— and —NH— radicals, and Y is an atom selected from the group consisting of oxygen and sulfur, which process comprises: reacting in the presence of an organotin catalyst a compound of the formula

YCN—R—NCY wherein R and Y are as aforestated, with a difunctional compound selected from the group consisting of a difunctional alcohol, amine, and amino alcohol having its two functional groups connected to the divalent organic radical R', wherein R' is as aforestated, and with a polyfunctional compound of the formula R''(OH)$_n$ wherein $n$ is greater than two and the latter said compound is selected from the group consisting of polyhydroxyglycerides, aliphatic hydrocarbon polyols, polyalkylene oxide condensation products of polyhydroxyglycerides, and polyalkylene oxide condensation products of aliphatic hydrocarbon polyols having a molecular weight in the range of 400 to 2000, and said organotin catalyst is selected from the group consisting of the formulas $Sn(OR)_2$
$Sn\ R'_2$
$R'_2SnO$
$Sn(OR)_4$
$Sn\ R'_4$
$M_2(Sn(OR)_4)$
$MH(Sn(OR)_4)$
$M_2(Sn(OR)_6)$
$MH(Sn(OR)_6)$
$M'(Sn(OR)_4)$
$M'(HSn(OR)_4)_2$
$M'(Sn(OR)_6)$
$M'(HSn(OR)_6)_2$

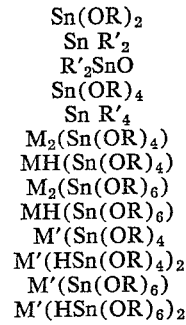

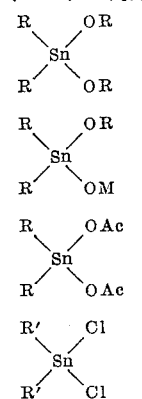

wherein each R represents an alkyl radical containing from 1 to 8 carbon atoms, each R' radical represents a substituent selected from those consisting of alkyl radicals containing from 1 to 8 carbon atoms and aryl radicals of the benzene series containing from 6 to 9 carbon atoms, M represents an alkali metal, M' represents an alkaline earth metal, and Ac represents an acyl radical derived from a monobasic carboxylic acid containing from 2 to 18 carbon atoms.

2. A process for preparation of a substantially monomeric modified organic isocyanate leather-treating composition of the formula

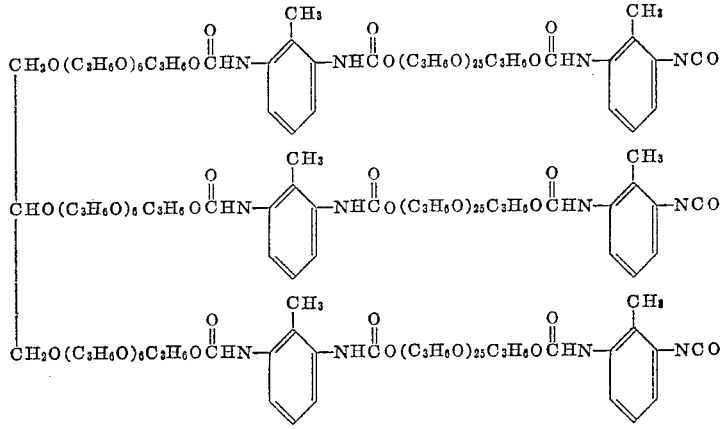

which process comprises:

reacting tolylene diisocyanate, polyoxypropylene glycol, and trihydroxy polyoxypropylene in the presence of di-n-butyltin dilaurate.

References Cited by the Examiner

UNITED STATES PATENTS 2,884,336    4/1959    Loshack et al. _ _ _ _ _ _ 260—77.5
3,061,557    10/1962    Hostettler et al. _ _ _ _ 260—77.5

FOREIGN PATENTS 229,548    7/1960    Australia.
1,212,252    3/1960    France.

LORRAINE A. WEINBERGER, *Primary Examiner.*
IRVING MARCUS, *Examiner.*
S. H. LIEBERSTEIN, L. A. THAXTON,
                            *Assistant Examiners.*